United States Patent [19]

Geck et al.

[11] 4,012,226
[45] Mar. 15, 1977

[54] PROCESS FOR STEEL PRODUCTION

[75] Inventors: Günther Geck, Hagen; Jürgen Langhammer, Bremen-Platjgenwerbe, both of Germany

[73] Assignee: Klockner-Werke AG, Duisburg, Germany

[22] Filed: May 23, 1974

[21] Appl. No.: 472,891

[30] Foreign Application Priority Data

May 25, 1973 Germany .......................... 2326684

[52] U.S. Cl. ....................................... 75/38; 75/40
[51] Int. Cl.² ......................................... C21B 13/14
[58] Field of Search .................................. 75/38, 40

[56] References Cited

UNITED STATES PATENTS

| | | | |
|---|---|---|---|
| 2,750,278 | 6/1956 | Morray ................................. | 75/40 |
| 2,923,615 | 2/1960 | Pearce ................................. | 75/40 |
| 2,951,756 | 9/1960 | Caranagh ............................. | 75/40 |
| 3,301,661 | 1/1967 | McGlynn et al. ...................... | 75/40 |
| 3,615,351 | 10/1971 | Happel ................................. | 75/38 |
| 3,894,864 | 7/1975 | Langhammer ......................... | 75/11 |

FOREIGN PATENTS OR APPLICATIONS

1,911,994  9/1970  Germany ........................... 75/44 S
1,314,039  4/1973  United Kingdom ................. 75/44 S Primary Examiner—M. J. Andrews
Attorney, Agent, or Firm—Michael J. Striker

[57] ABSTRACT

A charge of ore, pellets, sinter and the like is admitted into the top of a shaft furnace. In the upper region of the furnace, there are provided inlets through which a reducing gas is introduced into the furnace. Direct reduction of the charge takes place in the upper region of the furnace and yields iron sponge. The iron sponge forms a column in the furnace which extends from the upper region of the furnace into the lower region of the latter. A burner extends into the lower region of the furnace and continuously directs a flame against the lower end of the sponge column. As the iron sponge in the lower portion of the column melts, fresh iron sponge descends through the furnace and becomes exposed to the flame so that the iron sponge is continuously melted. The molten material is continuously withdrawn from the furnace. The charge may include alloying elements so as to permit alloying of the molten material to produce a steel having a desired composition.

15 Claims, 2 Drawing Figures

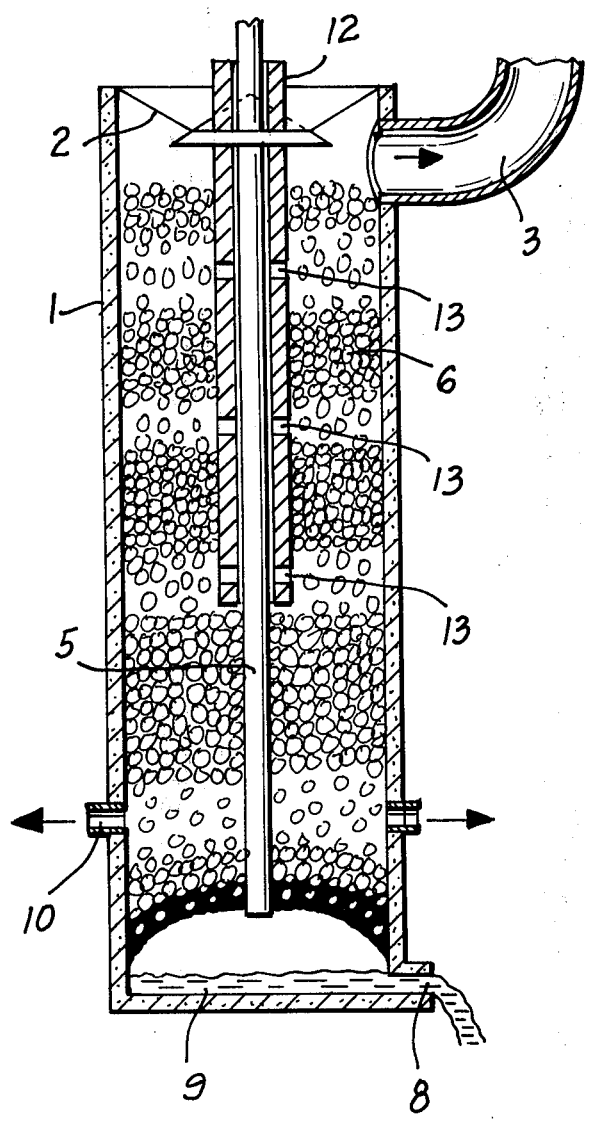

PROCESS FOR STEEL PRODUCTION

BACKGROUND OF THE INVENTION

The invention relates generally to the production of steel and, more particularly, to a process and arrangement for the production of steel using direct reduction.

The melting of scrap is known, for instance, from the German Pat. No. 1,800,610. Here, scrap is introduced into the top of a vertical melting chamber and melted near the bottom of the chamber by means of a burner extending into the chamber. The flame generated by the burner is centered with respect to the chamber and is of plate-shaped configuration. There is no provision, however, for the production of steel where direct reduction of the starting materials is required.

With the known reduction processes which may be generally classified as "direct reduction processes", it is possible to transform ore or pellets to iron or iron sponge. These direct reduction processes are carried out in the most diverse types of apparatus. The best known are direct reduction processes carried out in shaft furnaces using lump ore or pellets and direct reduction processes carried out in rotating tubular furnaces using fine ore and coal. The end product of the direct reduction is iron sponge. Generally, the iron sponge still contains small residual amounts of unreduced oxygen and, in addition, retains as an impurity component the gangue-like components of the ore which cannot be reduced. This intermediate product, namely, the impure sponge iron, is, therefore, mostly used in a second, independent processing step wherein it is utilized as a starting material, so to speak, for scrap in the conventional steel production apparatus.

There is, however, a disadvantage associated with this use of the impure sponge iron. This resides in the fact that the sponge iron exhibits a tendency to re-oxidize by virtue of its great porosity, i.e. by virtue of the large exposed surface area of the sponge iron. Even at low temperatures, this tendency for re-oxidation may lead to ignition of the iron sponge. As a consequence, extended charging times during which the sponge iron is unprotected from the surrounding atmosphere, as well as smelting methods which take place under oxidizing conditions, lead to unfavorable results. Due to the latter reason, iron sponge which is produced by direct reduction processes is melted predominantly in electric furnaces. Here, continuous charging methods for introducing the sponge iron into the furnace have been found to work better than the otherwise conventionally used discontinuous, bucket charging methods. However, even though the use of electric furnaces for melting the sponge iron overcomes, at least to some extent, the problem of re-oxidation of the sponge iron, there still exists the disadvantage that the production of steel must proceed in at least two distinct stages, namely, a first stage where the sponge iron is produced and a second stage where the sponge iron is melted in an electric furnace after having been conveyed thereto from the furnace used for its production.

Another process is known from the U.S. Pat. No. 3,615,351 where a shaft furnace is used. A column of sponge iron is formed in the furnace and the sponge iron is melted with air burners under oxidizing conditions with a concomitant formation of slag. The furnace is greatly widened at the bottom thereof and molten material collects at the bottom of the furnace. Although the production and melting of the sponge iron are here carried out in the same furnace so that the sponge iron need not be conveyed to a separate furnace, the facts that melting is performed under oxidizing conditions and that slag is formed, present certain problems. Moreover, the thermal efficiency of this process is low since the waste gases are removed in the melting region and the heat carried thereby is lost. The thermal efficiency is further reduced because the column of sponge iron sinks into the molten metal on the bottom of the furnace. As a result, large quantities of heat are removed from the molten metal so that it becomes difficult to maintain the melt at a sufficiently high temperature to permit removal thereof from the furnace by tapping. Also, the period for which the molten metal remains in the shaft furnace and is collected at the bottom of the furnace is relatively long so that substantial amounts of oxidation occur. Furthermore, since the process proceeds discontinuously, the heat-resistant material of the furnace is greatly stressed. In addition, the sponge iron produced here has closed pores so that it is not possible to pass gases through the sponge iron, even if this were desired.

SUMMARY OF THE INVENTION

It is, therefore, a general object of the invention to provide a novel process and arrangement for the production of steel.

Another object of the invention is to provide a process and arrangement which enable steel to be continuously produced in a simple manner.

A further object of the invention is to provide a process and arrangement which enable steel to be continuously produced in a single furnace.

An additional object of the invention is to provide a process and arrangement which enable steel to be produced in a single furnace at high thermal efficiencies.

Yet another object of the invention is to provide a process and arrangement which enable steel to be produced in a single furnace with the formation of minimum amounts of slag.

It is also an object of the invention to provide a process and arrangement which enable sponge iron to be produced and continuously melted in the same furnace and to be withdrawn from the latter as steel.

One more object of the invention is to provide a process and arrangement which enable sponge iron to be produced and continuously melted in the same furnace and to be withdrawn from the latter as steel, while holding slagging to the minimum possible.

Additionally, it is an object of the invention to provide a process and arrangement which enable sponge iron to be produced and continuously melted in the same furnace and to be withdrawn from the latter as steel, while holding slagging to the minimum possible and maintaining the greatest possible thermal efficiency.

In accordance with the foregoing objects, and others which will become apparent, the invention provides a process for the production of steel, particularly for the continuous production of steel, from ore, pellets, sinter and the like which, in brief, comprises admitting an iron-containing charge into a continuous zone such as a chamber of a furnace. Direct reduction of at least part of the charge is effected in a first portion of the furnace chamber and the reduced charge is melted in a second portion of the furnace chamber under non-oxidizing conditions and, advantageously, under reducing conditions.

As may be seen from the foregoing brief description of the process according to the invention, special interest is directed to a process for the continuous production of steel from ore, pellets, sinter or the like by direct reduction of the starting materials or charge. The furnace or oven used may be a shaft furnace and the direct reduction of the charge may cause a transformation of the starting materials into sponge iron. A column of the sponge iron may be formed in the furnace and melting may proceed by continuously melting the lower portion of the column.

Melting of the column of reduced charge or sponge iron may be effected by directng a flame at the lower end of the column from below this lower end. The flame may be generated by combustion of a fuel-oxygen mixture and, in accordance with the invention, the combustion proceeds with a deficiency of oxygen, that is, the quantity of oxygen in the fuel-oxygen mixture will be insufficient to cause complete combustion of the fuel. As the lower portion of the column melts, fresh reduced charge continuously moves downwardly through the furnace to become exposed to the flame so that it may be said that the column continuously descends through the furnace. According to the invention, the combustion gases may be conveyed through at least the lower portion of the column of reduced charge and in a direction countercurrent to the direction of movement of the fresh reduced charge which is moving towards the flame, that is, the combustion gases may be conveyed in an upward direction. Further in accordance with the invention, the molten material may be continuously removed or withdrawn from the furnace.

The burner and, hence, the flame used for melting the column of reduced charge may be centered with respect to the furnace chamber or the column. The flame generated by the burner may be of plate-shaped configuration. However, it is also possible to use a ring-shaped or annular flame or, on the other hand, to use a combination of plate-shaped and ring-shaped flames.

In carrying out the process of the invention, it is advantageous when provision is made for a short dwell time of the molten material in the furnace chamber so as to permit the molten material to become superheated. This may be achieved simultaneously in the process of the invention by suitably arranging the burner or burners above the molten material located beneath the column of reduced charge and/or by the use of additional agents for transmitting heat to the molten material at the bottom of the chamber in which the column of reduced charge is accommodated.

It is further favorable when the combustion gases or waste gases generated during the melting operation are used in the direct reduction stage for preheating the reducing gas or gases in order to economize on energy utilization. Similarly, it is favorable when the combustion gases or waste gases generated during the melting operation are used in the direct reduction stage directly for the reduction in order that these may perform the work of reduction. By proceeding in these ways, a further improvement in the efficiency of energy utilization may be realized.

The invention also provides an arrangement for the production of steel, particularly for the continuous production of steel, which comprises means defining a continuous zone or furnace chamber having an inlet for the admission of a charge. Means is provided in a first portion of the chamber for effecting direct reduction of the charge and, in a second portion of the chamber, there is provided means for melting the reduced charge.

The arrangement according to the invention is particularly well-suited for carrying out the process of the invention. The furnace may be a shaft furnace having a substantially constant cross-section. The means for effecting direct reduction of the charge may comprise inlets for the introduction of reducing gas into the region of the furnace where direct reduction takes place. In accordance with the invention, it is particularly advantageous when the lower region of the shaft furnace is simultaneously constructed as a melting chamber and when the inlets for the introduction of reducing gas are provided above the region of the furnace where melting occurs. A burner or burners may be provided and these are favorably arranged in such a manner as to be able to direct a flame onto or against the column of reduced charge from below the latter.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 is a longitudinal section through another form of an arrangement in accordance with the invention which may be used for carrying out the method according to the invention.

DESCRIPTION OF THE PREFERRED EMBODIMENTS

Figure 1:
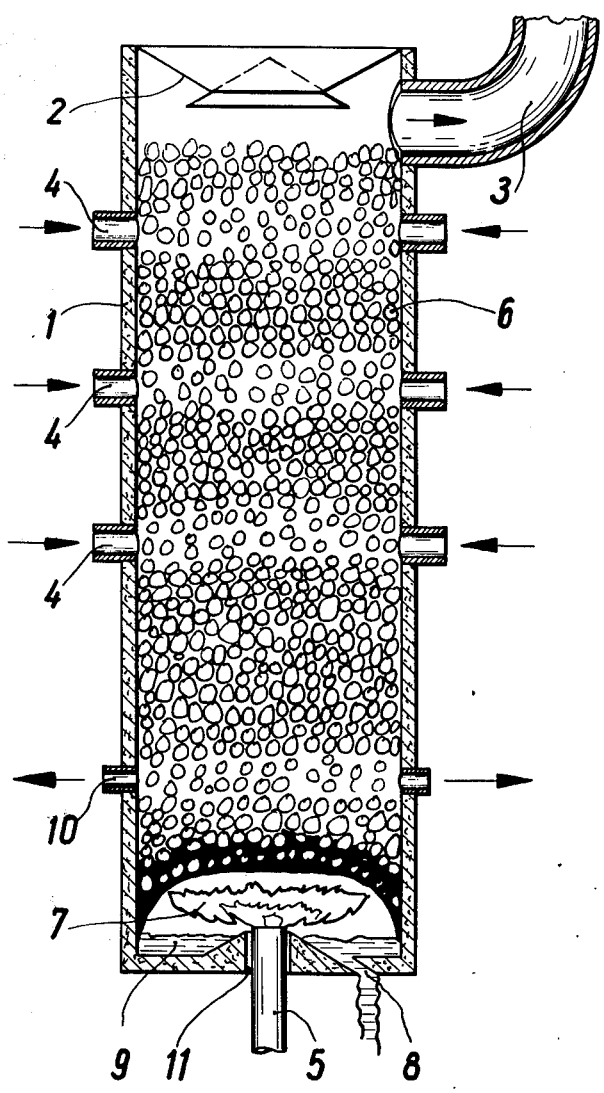
FIG. 1 is a longitudinal section through one form of an arrangement in accordance with the invention which may be used for carrying out the method according to the invention.

Referring first to FIG. 1, a shaft furnace or oven is indicated by reference numeral 1. The furnace 1 has an opening at its upper end and in the region of this opening there is provided a bell-shaped charging device 2 by means of which an iron-containing charge may be admitted into the interior or chamber of the furnace 1. The charge may include ore such as iron ore, pellets, sinter and like materials. The charge may also include alloying elements which are necessary to produce steel having a desired composition as well as other additions which might be desirable.

Direct reduction of the charge takes place in an upper portion of the furnace 1. For this purpose, inlets 4 are provided in the wall of the furnace 1 through which the reducing gas such as, for example, carbon monoxide, necessary for effecting reduction of the ore or the like may be introduced into the reduction region of the furnace 1. The inlets 4 may be in the form of ring-shaped or annular slots or they may be in the form of openings provided at spaced intervals about the circumference of the furnace 1. It may be seen that three vertically spaced sets of the inlets 4 are provided so that the direct reduction takes place in steps or stages. The direct reduction of the charge may be effective for transforming or converting the same into sponge iron.

The sponge iron, or the sponge iron plus the charge, form a column 6 interiorly of the furnace 1. Melting of the sponge iron or of the column 6 takes place in a lower portion of the furnace 1. For this purpose, a burner lance 5 extends through the bottom wall of the furnace 1. In the illustrated embodiment, the burner 5 is effective for generating a flame 7 of plate-shaped configuration. The flame 7 is directed against the lower portion or leading end of the column 6 and continuously melts the column 6 from below. The flame 7 may be produced by combustion of a fuel-oxygen mixture and, in accordance with the invention, the combustion proceeds with a deficiency of oxygen so that melting of the column 6 occurs under non-oxidizing conditions.

Melting of the column 6 produces a melt or molten material 9 which collects at the bottom of the furnace 1. The melt 9 continuously flows out of the furnace 1 via an outlet 8 provided for this purpose. If the charge contains alloying elements, then alloying of the melt 9 will occur at the bottom of the furnace 1 and, in such an event, the molten material leaving the furnace 1 through the outlet 8 will be steel having a desired composition. By maintaining the flame 7 in close enough proximity to the melt 9, it is possible to provide for superheating of the melt 9 in the furnace 1.

As the flame 7 continuously melts the lower portion of the column 6, the latter continuously descends through the furnace 1. In other words, as the flame 7 continues to melt the lower portion of the column 6, fresh sponge iron continuously moves downwardly through the furnace 1 into the portion of the latter where melting occurs. Thus, fresh sponge iron continuously replaces the sponge iron which has melted and fresh sponge iron is continuously becoming exposed to the action of the flame 7. In this manner, a continuous melting operation is effected in the portion of the furnace 1 where melting occurs. In accordance with the invention, this portion of the furnace 1 is constructed or outfitted in the manner of a melting chamber.

It may be seen that the burner 5 extends through the bottom wall of the furnace 1 with clearance so that a ring-shaped or annular passage 11 is defined between the burner 5 and the bottom wall of the furnace 1. If desired, reducing gases may be admitted into the furnace 1 through the passage 11. Upon entering the furnace 1, these gases will be heated by the flame 7 generated by the burner 5. The thus-heated reducing gases may then flow through the column 6 in a direction countercurrent to the column 6 or to the fresh sponge iron which is to become exposed to the action of the flame 7, that is, the thus-heated gases may then flow upwardly in the furnace 1.

The region of the bottom wall of the furnace 1 in the vicinity of and surrounding the burner 5 is provided with a wall-like or dam-like upwardly extending projection as is clearly apparent. The purpose of this projection is to prevent penetration of the molten material 9 which collects at the bottom of the furnace 1 into the passage 11 defined between the burner 5 and the bottom wall of the furnace 1.

The melting operation generates combustion gases or waste gases. These gases will flow upwardly through the furnace 1, that is, in a direction which is countercurrent to the direction of motion of the fresh sponge iron which is to become exposed to the action of the flame 7. The combustion gases, or a portion thereof, may be withdrawn from the furnace 1 via outlets 10 located at the sides of the furnace 1. The outlets 10 are so positioned that the combustion gases must flow through at least the lowermost portion of the column 6 before they are permitted to leave the furnace 1. If only part of the combustion gases are withdrawn via the outlets 10, the remainder will continue to flow upwardly through the furnace 1. In accordance with the invention, the combustion gases may be used for preheating the reducing gases which are to be introduced into the direct reduction stages. The combustion gases withdrawn from the furnace 1 through the outlets 10 may be used for this purpose and the preheating of the reducing gases may be effected by after-burning of these combustion gases.

An exhaust conduit 3 is provided in the region of the top of the furnace 1 and communicates with the interior of the latter. The total waste gases, including combustion gases, generated in the furnace 1 and which have travelled to the region of the upper end of the latter are withdrawn from the furnace 1 through the conduit 3. These gases may, if desired or necessary, be suitably treated and then reintroduced into the furnace 1 as reducing gases through the inlets 4.

According to the invention, it may be advantageous if, instead of arranging the burner or burners so as to extend through the bottom wall of the furnace, a burner or burners are used which extend through the column of sponge iron in a suitable support or guide. The guide may then be provided with suitable openings or passages through which reducing gas may be introduced into the direct reduction stage or stages. Again, the burner or burners are favorably arranged in such a manner that the flame or flames generated thereby may be directed against the lower portion or leading end of the column of sponge iron.

An arrangement illustrating this embodiment of the invention is depicted in FIG. 2. Here, the same reference numerals as in FIG. 1 have been used to designate similar components. Aside from the fact that the inlets 4 have been omitted, which will be referred to again below, the arrangement of FIG. 2 differs from that of FIG. 1 primarily in the manner in which the burner 5 is arranged.

The burner 5 here extends into the furnace 1 through the upper end of the latter and passes through the column 6 of sponge iron and charge. It may be seen that the burner 5 is of such a length that it extends through the reduction portion of the furnace 1 and into the melting portion thereof. Thus, the end or section of the burner 5 at which the flame is generated may be located below the leading end of the column 6 during the melting operation so that the flame may be directed at the lower portion or leading end of the column 6. Again, such positioning of the burner 5 will permit superheating of the molten material 9 at the bottom of the furnace 1 if desired.

The burner 5 is supported or guided by a support or guide 12. The burner 5 and/or the guide 12 are movably mounted in such a manner that the burner 5 may be displaced in axial direction thereof so as to permit withdrawal of the burner 5 from the furnace 1 and adjustment of the level of the flame-generating section of the burner 5 in the furnace 1. It will be seen that the guide 12 is provided with openings or passages 13. The purpose of the openings 13 is to permit the introduction of reducing gas into the reduction portion of the furnace 1 so as to effect direct reduction of the charge admitted into the latter. In this manner, reducing gas may be supplied to the charge from the interior of the column 6.

In accordance with a particularly advantageous embodiment of the invention, the furnace 1 of FIG. 2 is further provided with inlets 4 such as those of FIG. 1 for the introduction of reducing gas into the furnace 1. Thus, the reducing gas supplied to the furnace 1 through the openings 13 will be additional to that supplied to the furnace 1 via the inlets 4. In this manner, reducing gas may be supplied to the column 6 from both interiorly and exteriorly thereof. This permits a better penetration of the reducing gas into and through the column 6 as opposed to the case where the reducing gas is introduced into the furnace 1 only through the inlets 4 provided in the wall of the latter or the case where the reducing gas is introduced into the furnace 1 only via the openings 13 in the guide 12.

As already mentioned, the melting operation according to the invention proceeds under non-oxidizing conditions and, advantageously, under reducing conditions. Thus, when melting is effected by means of a flame produced by combustion of a fuel-oxygen mixture, the combustion proceeds with a deficiency of oxygen. The deficiency of oxygen may be achieved in different ways. On the one hand, the melting may proceed under less-than-stoichiometric conditions, that is, under conditions where the fuel-oxygen mixture supplied to the burner contains a proportion of oxygen which is less than the stoichiometrically required proportion. In this event, the fuel, for instance, oil, will be only partially combusted and the oxygen content of the gases generated by the melting operation will be maintained at a low level. On the other hand, the melting may proceed without the introduction of secondary or auxiliary air in which event the gases generated by the melting operation will have a high carbon monoxide content. Wherever reference is made herein to terms such as "the quantity of oxygen in the fuel-oxygen mixture is less than that required to cause complete combustion of the fuel in the mixture", it will be understood that both of the above possibilities are embraced thereby.

By proceeding in accordance with the invention, the heretofore conventional two-stage process for the production of steel, namely, direct reduction of a charge to sponge iron in a first furnace and subsequent melting of the sponge iron in a second furnace and in a distinct processing stage, may be avoided. In addition, the production of steel according to the invention may proceed continuously by virtue of the fact that the melting operation may be fully continuous.

Furthermore, the cooling of the sponge iron from the temperature of the reduction stage which normally occurs in the conventional processes and the necessity for subsequently reheating the sponge iron from the reduced temperature thereof to the melting temperature are also avoided by the invention. Thus, good energy utilization is achieved according to the invention. Moreover, no problems exist as regards re-oxidation of the sponge iron since, due to the oxygen deficiency, the sponge iron is maintained under non-oxidizing or reducing conditions and, further, the sponge iron is melted immediately after the reduction. Also, the discharging and charging apparatus which would normally be required for the discharge of the sponge iron from the reduction stage and for the admission of the sponge iron into the melting stage may be eliminated in accordance with the invention since there is no longer any need for transporting the sponge iron between these two stages. The invention also has the advantage that the additions or alloying elements required to obtain a final, desired steel analysis may already be introduced when charging the ore or the like. The additions or alloying elements may even be partially in the form of oxides upon introduction thereof. In addition, the process of the invention is, of course, further favorable with respect to the inexpensive energy requirements in accordance with the invention.

By proceeding according to the invention, it also becomes possible to effect the reduction at relatively high temperatures of the order of 1000° C and, advantageously, even higher than this, which is not normally possible because of the so-called "sticking effect". This effect resides in that the individual lumps or particles of the charge are baked together at their outer surfaces, that is, that the individual lumps of the charge become bound to one another, and this has the result that the sponge iron or charge may be removed from the reduction chamber only with great difficulty. However, by virtue of the sinking or descent of the column of melting stock, which latter comprises reduced sponge iron, in the furnace when using the invention, the sticking effect plays no role since the baking together of the charge materials or the sponge iron does not affect the subsequent melting. In contrast, the sticking effect may favorably influence the melting since it is precisely because of this effect that the lumps or particles of iron sponge produced in the reduction portion of the furnace become welded to one another at their respective contact points under the influence of the increasing temperature in downward direction of the furnace to thereby form an arch in the region of the lower end of the column of melting stock. This arch supports itself against the bottom of the furnace, the manner in which the arch bears against the bottom of the furnace depending upon the shape of the flame being used. Where the flame is centrally located with respect to the column, the arch will bear against the bottom of the furnace in the region of the edge of the bottom whereas, when a ring-shaped or annular flame is used, the arch will bear against the bottom of the furnace at approximately the center of the bottom. Since only a small contact area is thereby maintained between the column of melting stock and the melt at the bottom of the furnace, the heat transfer between the column of melting stock and the melt may be held to very low values. The flame with which the column is continuously melted at a rate depending upon the manner in which the material or sponge iron descends in the furnace, will be located in the arch or cavity formed by the welded lumps or particles of sponge iron.

In contrast to other steel production processes, the wear or stress to which the heat-resistant or fire-resistant material of the furnace, particularly that in the melting portion of the furnace, is subjected when using the invention is low. Thus, on the one hand, the flowing melt rests upon the bottom of the furnace thereby protecting the same whereas, on the other hand, the melting stock bears against the walls of the furnace thereby protecting the latter.

Due to the continuous operation achieved with the invention, a high production rate is achieved relative to the diameter and volume of the melting portion of the furnace. The high production rate permits the melting portion of the furnace to be relatively small as compared to the size of the melting chambers which are required for the conventional, discontinuously operating steel production process. Consequently, reduced investment and maintenance costs may be achieved in accordance with the invention. Moreover, the continuous withdrawal of the melt from the melting portion of the furnace also leads to reduced stressing or wear of the heat-resistant material of the melting portion.

It will be understood that each of the elements described above, or two or more together, may also find a useful application in other types of arrangements and processes differing from the types described above.

While the invention has been illustrated and described as embodied in an arrangement and process for steel production, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A process for the production of steel from a reducible iron-containing charge, comprising the steps of introducing said charge into a generally vertically extending zone so as to form a downwardly moving charge column in said zone; directly reducing said charge in a first portion of said zone by contacting said charge with a reducing substance thereby forming sponge iron from said charge; melting said sponge iron in a second portion of said zone by directing a flame against the bottom of said column, said flame being produced by combustion in said second portion of said zone of a mixture which includes fuel and oxygen, and said oxygen being present in an amount which is less than that necessary for complete combustion of said fuel so that melting of said sponge iron occurs under substantially non-oxidizing conditions; passing at least part of the combustion gases generated by said combustion through at least part of said column and in countercurrent motion to the latter; and withdrawing the molten material produced by melting of said sponge iron from said zone.

2. A process as defined in claim 1, wherein said direct reduction is carried out at a temperature in the range of at least about 1000° C.

3. A process as defined in claim 1, further comprising the step of introducing at least part of said combustion gases into said first portion of said zone for effecting said direct reduction.

4. A process as defined in claim 1, wherein said melting is performed under reducing conditions.

5. The process of claim 1 wherein the alloying elements required to obtain a desired steel composition are incorporated in said charge so as to be alloyed with the iron in said second portion of said zone.

6. The process of claim 1 wherein the dwell time of said molten material is sufficient to cause the same to become superheated whereupon said molten material is withdrawn from said zone.

7. A process as defined in claim 1, wherein each of said steps is performed substantially continuously.

8. A process as defined in claim 1, wherein said charge comprises at least one member of the group consisting of ore, pellets and sinter.

9. A process as defined in claim 1, wherein said charge comprises at least one member of the group consisting of ore, pellets and sinter and each of said steps is performed substantially continuously.

10. A process as defined in claim 1, wherein melting of said sponge iron is performed substantially exclusively with said flame.

11. The process of claim 1 wherein said direct reduction is effected by introducing a reducing gas into said first portion of said zone.

12. A process as defined in claim 11 comprising directing a flame at said reduced charge and being effective for producing combustion gases, and said direct reduction being effected by introducing reducing gas into and further comprising the step of preheating said reducing gas with at least part of said combustion gases.

13. A process as defined in claim 12, wherein said combustion gases are afterburned exteriorly of said zone prior to the preheating step.

14. A process as defined in claim 1, wherein said flame is directed against only a restricted portion of said bottom of said column so as to cause the formation of an arch from said sponge iron due to the coherence and selective melting of the sponge iron particles in the area of contact with said flame and thereby cause at least part of said bottom of said column to remain spaced from said molten material.

15. The process of claim 14 wherein said flame is directed against the center portion of said bottom of said column.

* * * * *